UNITED STATES PATENT OFFICE.

RUDOLF LENDER AND ALBERT KOCH, OF NEU-BABELSBERG, GERMANY.

PAINT AND VARNISH BASE.

1,019,666. Specification of Letters Patent. Patented Mar. 5, 1912.

No Drawing. Application filed November 17, 1911. Serial No. 660,899.

*To all whom it may concern:*

Be it known that we, RUDOLF LENDER, a subject of the King of Prussia, and ALBERT KOCH, a subject of the King of Wurttemberg, both residing at Neu-Babelsberg, Germany, have invented certain new and useful Improvements in Paint and Varnish Bases; and we do hereby declare the following to be a full, clear, and exact description of the invention, such as will enable others skilled in the art to which it appertains to make and use the same.

Our invention relates to a varnish base to be used in the manufacture of varnishes, lacquers, enamels and paints as a binder in the manufacture of linoleums, lincrusta and oil cloths.

The preparation of Chinese wood oil, so called "Tong oil" for paints and varnishes by the admixture therewith of resins as colophonium, copal, &c. has been attempted, but such products have been more or less unsatisfactory in producing a commercial article to satisfy the demands of the users.

We have found by many experiments that the practical objections to mixtures or varnishes and paint bases is entirely overcome if we use in place of resins the polymerization products of that group of chemical compounds known as the cumarone and indene group, of which *e. g.* parindene and paracumarone are types.

We proceed as follows: Ten kilos of Chinese wood oil or Tong oil is heated to 220–240° C., and a quantity of the polymerization products of the cumarone and indene group is added to suit the conditions of use, generally an equal quantity of such products, but they may be increased to about 90% of the mixture, if desired. There results a homogeneous mass which is hard when cold. This substance then becomes the base from which the varnish, lac, enamel or similar painter's material is made. This base is then heated and mixed with a suitable solvent as liquid hydrocarbons (*e. g.* benzin, ligroin, benzol obtained from petroleum or from different kind of tar) and chlorinated hydrocarbons (*e. g.* carbon tetrachlorate), also turpentine oil and other terpenes, and a clear liquid results. The amount of solvent used is dependent upon the consistency of the product desired and the use to be made of it. It may be thinned at will. To the mixture of base and solvent may be added any desired coloring matter and the varnish or paint dries rapidly to a brilliant, hard but elastice coating, impervious to liquids and unattacked by gases. It has exceptional resistance to water, acids alkalis, heat and cold.

A varnish, paint or other similar product of this substance has a much wider range of use than any other similar product, or an other product containing Chinese wood oil and resins. For example, it does not become tacky; it does not set by the addition of such pigments as lead or zinc compounds.

The polymerization products prevent the decomposition of the wood oil, which the resins do not accomplish.

We claim:—

1. Process of manufacturing a paint and varnish base, which comprises mixing Chinese wood oil (Tong oil) with a polymerization product of the cumarone and indene group of compounds at a temperature above 100° C.

2. A paint or varnish base comprising Chinese wood oil (Tong oil) and one or more of the polymerization products of the cumarone and indene group.

In testimony that we claim the foregoing as our invention, we have signed our names in presence of two subscribing witnesses.

RUDOLF LENDER.
ALBERT KOCH.

Witnesses:
HENRY HASPER,
RICHARD GOETZ.